(12) United States Patent
Lindenblatt et al.

(10) Patent No.: US 6,419,080 B1
(45) Date of Patent: Jul. 16, 2002

(54) SPIRAL SINGULATOR

(75) Inventors: Bruno Lindenblatt; Dale Vernon, both of Prince George (CA)

(73) Assignee: Linden Fabricating & Engineering (Prince George) Ltd., British Columbia (CA)

(*) Notice: Subject to any disclaimer, the term of this patent is extended or adjusted under 35 U.S.C. 154(b) by 0 days.

(21) Appl. No.: 09/775,328

(22) Filed: Feb. 1, 2001

(30) Foreign Application Priority Data

Nov. 9, 2000 (CA) ............................................. 2325317

(51) Int. Cl.$^7$ ............................................. B65G 33/06
(52) U.S. Cl. ........................................ 198/663; 198/443
(58) Field of Search ................................. 198/663, 443

(56) References Cited

U.S. PATENT DOCUMENTS

| | | | |
|---|---|---|---|
| 1,609,474 A | 12/1926 | Jocobson | |
| 3,279,582 A | 10/1966 | Bilocq | 198/33 |
| 3,373,868 A | 3/1968 | Missioux et al. | 209/97 |
| 3,511,356 A | * 5/1970 | Bilocq | 198/443 |
| 3,604,481 A | 9/1971 | Dobbs et al. | 143/32 |
| 3,638,792 A | 2/1972 | Bilocq | 209/73 |
| 3,776,378 A | 12/1973 | Booth et al. | 209/73 |
| 4,077,524 A | 3/1978 | Rysti | 214/8.5 |
| 4,431,367 A | 2/1984 | Pousette et al. | 414/748 |
| 4,444,538 A | 4/1984 | Manley | 414/176 |
| 4,852,716 A | 8/1989 | Roche | 198/443 |
| 4,911,283 A | 3/1990 | Hollins | 198/463.5 |
| 4,930,616 A | 6/1990 | Lindberg | 198/463.6 |
| 4,949,769 A | 8/1990 | Cameron | 144/245 |
| 5,119,930 A | 6/1992 | Stelter | 198/463.5 |
| 5,174,351 A | 12/1992 | Lindenblatt et al. | 144/356 |
| 5,217,106 A | 6/1993 | Bunney | 198/463.5 |
| 5,257,688 A | 11/1993 | Fridlund | 198/443 |
| 5,423,417 A | 6/1995 | Redekop | 198/774.2 |
| 5,518,106 A | 5/1996 | Allard | 198/459.5 |
| 5,653,570 A | 8/1997 | Weirathmueller | 414/746.6 |
| 5,662,203 A | 9/1997 | St. Pierre et al. | 198/463.5 |
| 5,678,681 A | 10/1997 | Klockars et al. | 198/773 |

FOREIGN PATENT DOCUMENTS

| | | | |
|---|---|---|---|
| CA | 1091611 | 12/1980 | |
| CA | 1277682 | 12/1990 | |
| CA | 2077777 | 3/1993 | |
| CA | 2046961 | 5/1994 | |
| DE | 2513115 | * 10/1976 | 198/663 |
| DE | 3214376 | * 6/1983 | 198/443 |
| DE | 278734 | 12/1988 | |
| EP | 0481164 A1 | 10/1990 | |
| SU | 398480 | 9/1973 | |
| SU | 412093 | 1/1974 | |
| SU | 458448 | * 3/1975 | 198/443 |
| SU | 472875 | 6/1975 | |
| SU | 490513 | 11/1975 | |
| SU | 665958 | 6/1979 | |
| SU | 922009 | 4/1982 | |
| SU | 997845 | 2/1983 | |
| SU | 1188072 | 5/1983 | |
| SU | 1087208 | 4/1984 | |
| SU | 1409551 | * 7/1988 | 198/663 |

* cited by examiner

Primary Examiner—James R. Bidwell
(74) Attorney, Agent, or Firm—Micahel A. Glenn

(57) ABSTRACT

Log indexing apparatus includes a frame and a series of laterally spaced spiral rolls that are inclined from front to back between the infeed and the outfeed, and are also inclined sideways. The spiral rolls are rotated synchronously and are arranged so that the gaps between the flights of the spirals define an upward moving log-receiving trough across the width of the device. The sideways inclination reduces the tendency of the logs to ride on the edges of the flights of the spirals.

12 Claims, 3 Drawing Sheets

SPIRAL SINGULATOR

TECHNICAL FIELD OF THE INVENTION

This invention relates to devices for unscrambling, singulating and ending logs.

BACKGROUND OF THE INVENTION

The invention is used to unscramble bundles of logs and to promote the logs from the bundle to another, usually higher, location. Generally speaking, devices that do this are well known. Such devices are sometimes called indexing apparatus, unscramblers or singulators. The term "singulator" refers to the fact that the devices are usually designed to deliver a single log at a time to an outlet of the device.

Examples of prior art unscrambling and singulating devices are found in U.S. Pat. No. 5,653,570 to Weirathmueller; U.S. Pat. No. 5,257,688 to Fridlund; U.S. Pat. No. 5,423,417 to Redekop and Canadian Patent No. 1,091,611 to Hallstrom.

One form of singulator that is relatively well known comprises a series of steps moving along an incline from an inlet location to an outlet location. Two groups of reciprocating cooperate so as to gradually promote logs toward the outlet. Such devices are typified by Canadian Patent No. 1,277,682 to Ekholm.

Another form of singulator is described in U.S. Pat. No. 5,119,930 to Stelter. The '930 patent relies on multiple stages of movable quadrants to promote and singulate logs. The top portion of each quadrant presents a log supporting shelf that diminishes in size against a fixed surface as the quadrant moves through an arc so as to limit the number of logs promoted to the next stage.

The foregoing systems each involve step-wise reciprocating motion. Such motion in heavy machinery generates significant noise, and the repetitive contact between parts causes considerable wear.

It is an object of the present invention to provide an alternative yet effective approach to unscrambling and singulating logs.

It is a further object of this invention to provide such a device that is self-cleaning, that automatically ends logs, and in which both noise and wear is reduced in relation to prior art systems.

SUMMARY OF THE INVENTION

The present invention provides a series of laterally spaced inclined spiral rolls extending between an inlet location where logs are received in a bundle, and an outlet location at a higher elevation than the inlet location.

The outlet is rearwardly offset in relation to the inlet so that the spiral rolls have a front to back inclination. The spiral rolls of the invention are also inclined sideways, i.e. they define on angle in relation to the feed direction. The spiral rolls comprise a pipe roll and a flange or "flight" wrapped around the pipe roll to define a spiral or helix about the length of the pipe roll. The gaps on the pipe roll between successive revolutions of the flight are aligned with the gaps on the adjacent spiral rolls. The series of adjacent gaps across the plurality of spiral rolls defines an elongated log-receiving trough. The spin of the spiral rolls is also synchronized so as to promote the log-receiving trough in an even upward motion. In the area of the infeed, the action of the spiral flights digging into the log bundle assists in dislodging individual logs and urging them into the log-receiving trough.

The resulting device has the advantage of continuous action, thereby avoiding the repetitive loud banging associated with prior art singulators, and reducing wear on the moving parts.

Another advantage of the invention is that the logs are continuously "ended" in one direction by the turning action of the spiral rolls. Ending the logs refers to aligning the end of a log against a reference surface. Such ending assists in measuring the logs and in controlling subsequent advancement and cutting operations for the log.

It is a further feature of the invention that the sideways inclination of the spiral rolls allows the logs to more closely abut the face of the helical flights. Without such a sideways angle, the logs would ride on the sharp edges of the flights thus impeding smooth progress of the logs.

Other aspects of the invention will be appreciated by reference to the detailed description that follows and are more particularly defined by the claims.

BRIEF DESCRIPTION OF THE DRAWINGS

The invention may be more fully appreciated by reference to the following description of the preferred embodiment and by reference to the drawings thereof in which.

DETAILED DESCRIPTION OF THE PREFERRED EMBODIMENT

Figure 1:
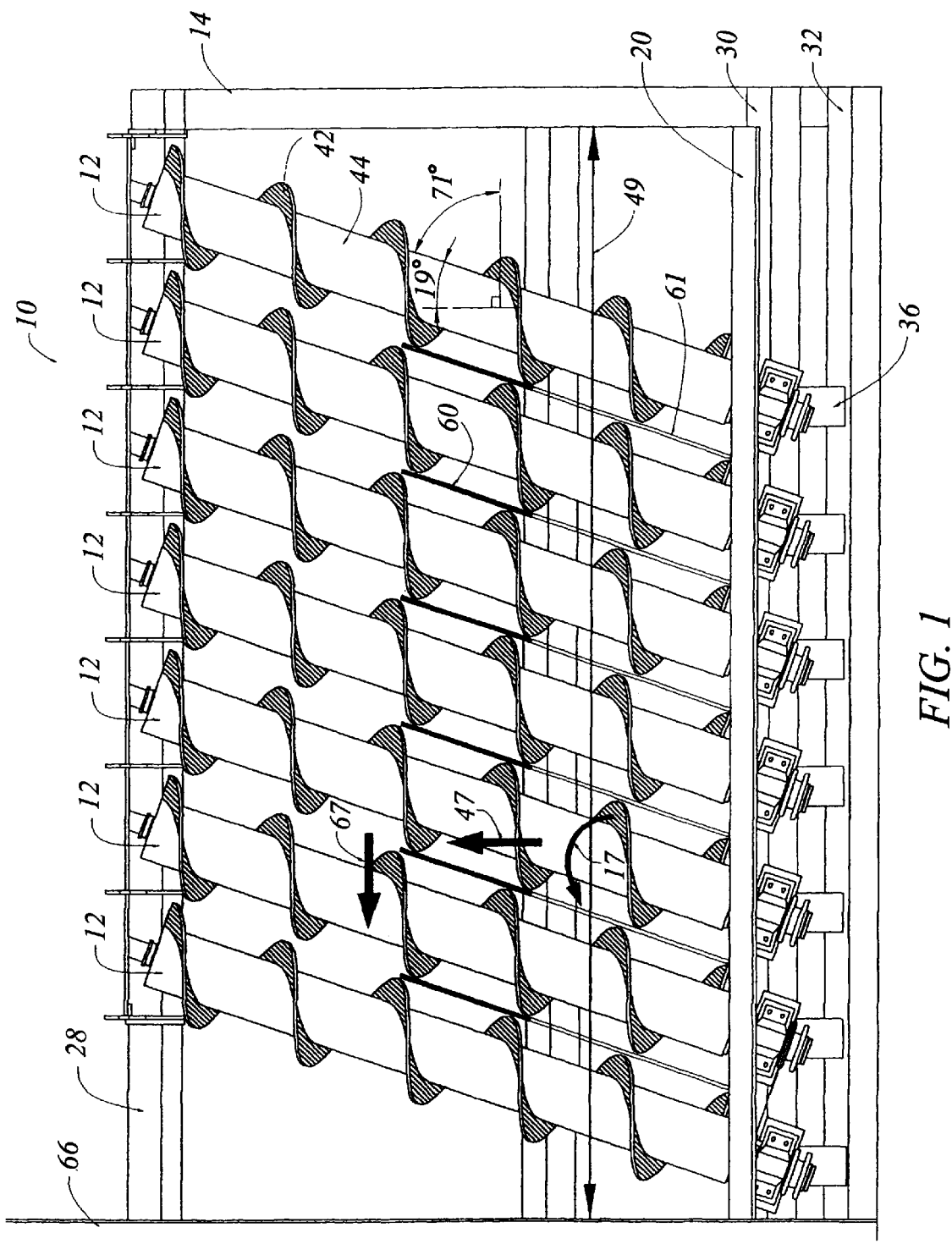
FIG. 1 is a view of the preferred embodiment of the invention; taken from a point above and normal to the spiral rolls.

FIG. 1 illustrates a spiral singulator 10 according to the invention. A plurality of spiral rolls 12 are mounted on a frame 14.

Figure 2:
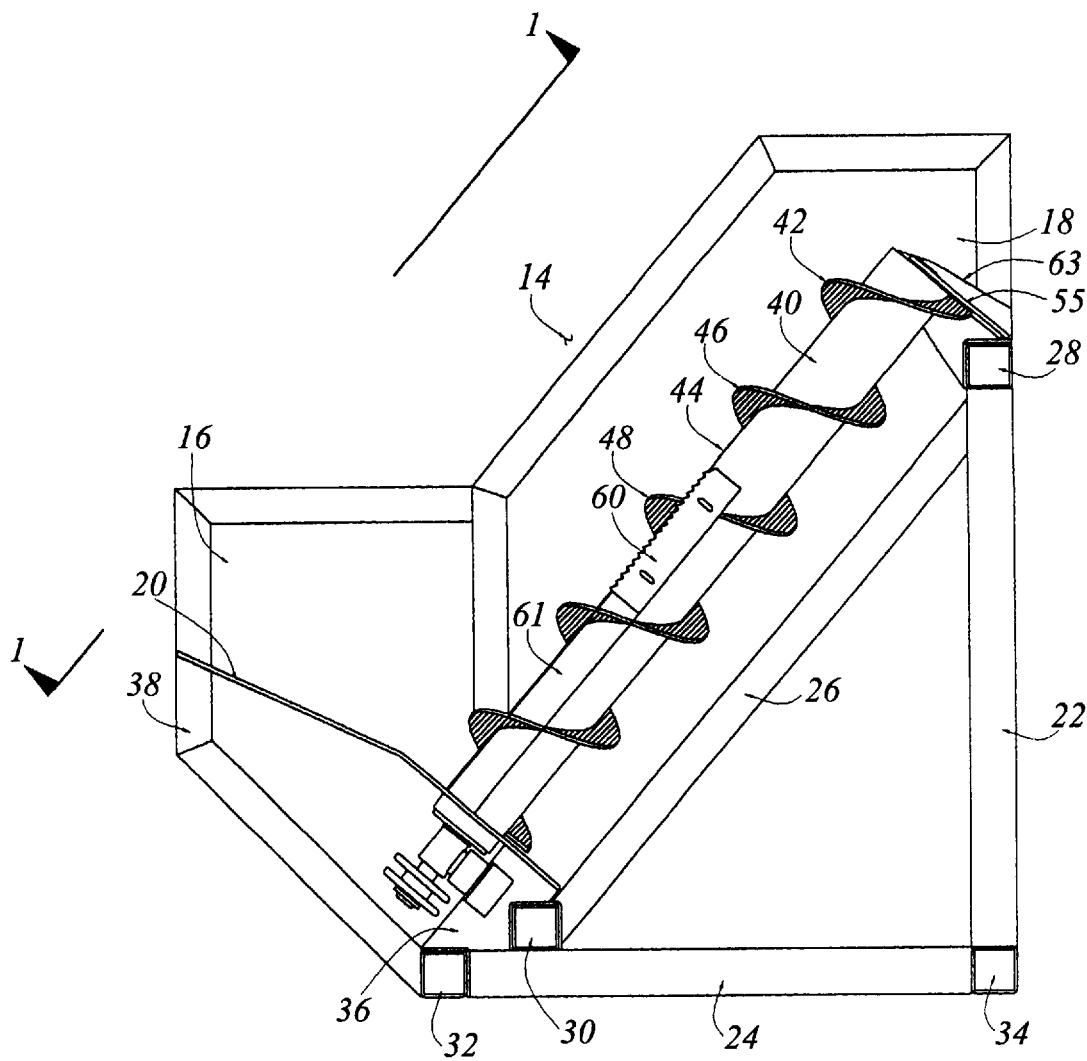
FIG. 2 is a side elevation of the preferred embodiment.

Referring FIG. 2, the spiral singulator 10 delivers logs from an inlet location (infeed) 16 where the logs are received in a scrambled and unsingulated bundle, to the outlet location (outfeed) 18 to which the device delivers singulated and ended logs. Infeed 16 includes an inclined skid plate 20 for receiving and holding a bundle of randomly distributed logs. The outfeed location is rearwardly offset in relation to the infeed location.

Frame 14 comprises vertical members 22 at the rear of the singulator, horizontal base members 24 extending from front to back of the singulator and diagonal bracing members 26. Upper cross member 28, intermediate cross member 30, and cross members 32 and 34 extend across the width of the device.

Figure 3:
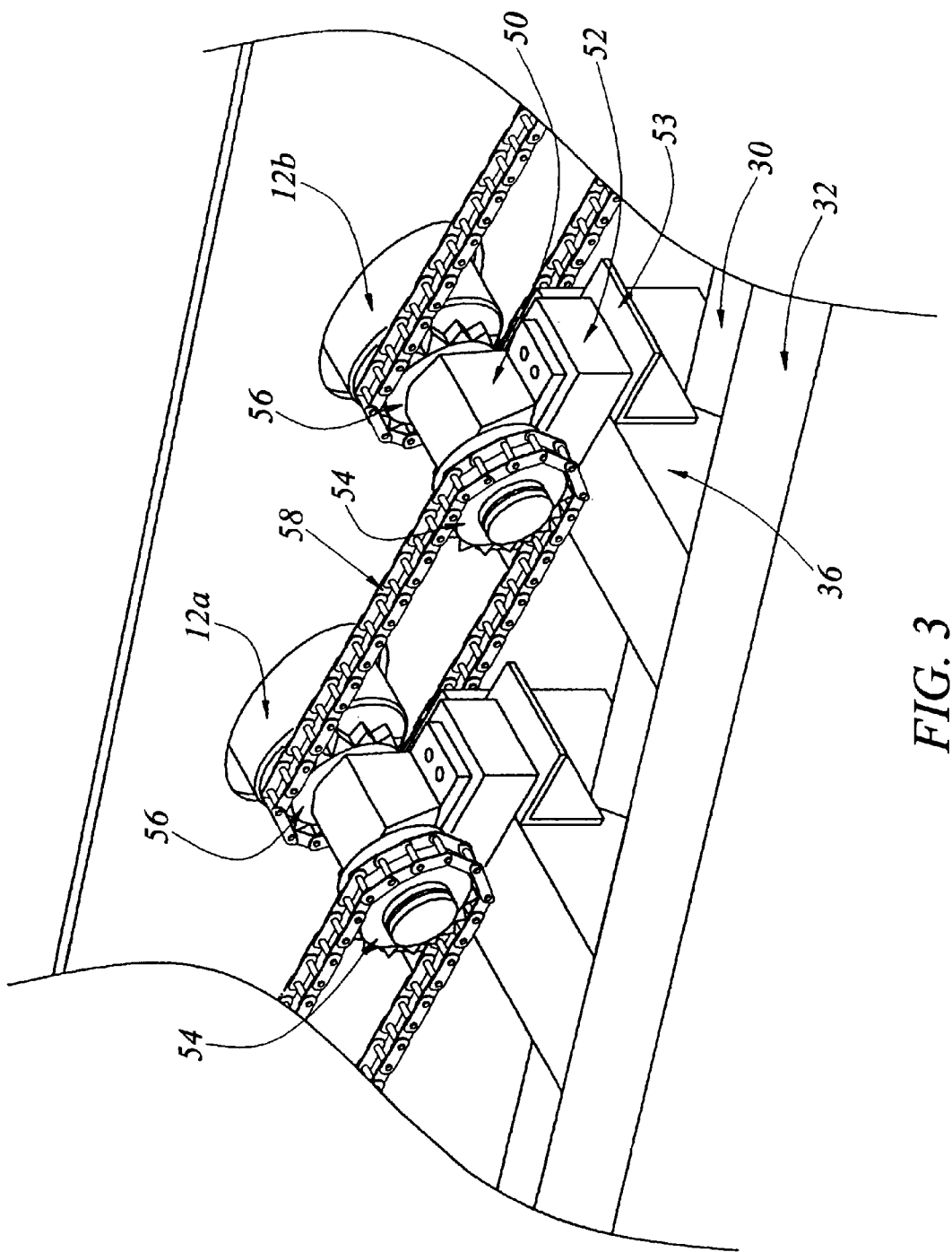
FIG. 3 is a front view of roller chain and bracket assemblies for two of the spiral rolls.

Skid plate 20 extends at an incline from intermediate cross member 30 upward and toward the front of the singulator. The bottom of skid plate 20 is braced against a series of spaced bearing pedestals 36, only one of which is visible in FIG. 2. The bottom of the spiral roll extends through an opening at the bottom of skid plate 20, as best illustrated in FIG. 3. The top of the skid plate is braced against an infeed frame 38 (FIG. 2).

Referring to FIGS. 1 and 2, a plurality of spiral rolls 12 are spaced laterally from one another across the width of the singulator 10. Spiral rolls 12 are inclined from front to back between the bottom portion of the infeed 16 and the outfeed 18. This front to back inclination corresponds to the feed direction indicated by arrow 47. It will be appreciated that the feed direction extends along a straight line between the infeed and the outfeed locations, the line being normal to both. In the preferred embodiment, the front to back inclination of the spiral rolls (as best seen in FIG. 2) is about 50° to the horizontal. However the specific angle of front to back inclination will depend on the size of the logs to be fed by the device, the height of the flights on the pipe rolls and the number of spiral rolls available to support a given log. It is contemplated that any angle between 10° and 80° would be within the scope of the present invention.

Each spiral pipe roll 12 comprises an elongated pipe roll 40 to which a flange or flight 42 has been helically welded about the length of the roll to define a spiral shape. The spiral configuration defines a series of gaps 44 between successive revolutions (e.g. 46, 48) of the flight. The flights may be arranged in either a right hand or left hand screw configuration, the right hand configuration being shown in the drawings. Thus rotation of the spiral rolls clockwise (as indicated by arrow 17) when viewed from the top of the spiral rolls promotes the gaps upward.

The laterally adjacent plurality of spiral rolls 12 are arranged such that their gaps 44 and flights 42 are horizontally aligned as seen in FIG. 1 so as to define an elongated log-receiving trough 49 extending across the width of the singulator 10.

The flights 42 on the spiral rolls 12 define a helical face angle, namely the angle defined between the face of the flight and the longitudinal axis of the roll.

In addition to being inclined from front to back, spiral rolls 12 are also inclined sideways as seen in FIG. 1, i.e. their longitudinal axes define an angle of less than 90° in relation to the transverse axis (side to side) of the singulator. In the preferred embodiment, this angle is about 71°. Taken in relation to the vertical, the sideways angle is about 19°. This may also be viewed as an offset angle in relation to the feed direction 47. This inclination allows the logs in the log-receiving trough 49 to come into fuller face contact with the face of the flights 42. Absent such inclination, the logs would rest on the relatively sharp outer edges of the flights thereby causing the flights to dig into the logs, or to catch on branches, notches or imperfections in the logs and thereby impede progress of the logs. Maximizing contact with the face of the flights and minimizing contact with their edges encourages smooth promotion of the logs upwards. The specific angle of sideways inclination may vary, however preferably the sideways angle as defined in relation to the vertical to be close to the helical face angle so as to allow presentation of the face of the flight to the side of the log. It is contemplated that any sideways angle in relation to the vertical that is within 35° of the helical face angle is within the scope of the invention.

Each spiral roll 12 is mounted for rotation at its lower end in a bushing 50 within a bracket 52. Each bracket 52 is mounted on a support plate 53 mounted on a block 52 that is in turn secured to a bracket 53 and a bearing pedestal 36. Bearing pedestal 36 extends between cross member 32 and intermediate cross member 30. The bearing pedestals may also be used to support the skid plate 20.

The top of the spiral roll is mounted for rotation on an end plate 55 extending diagonally from upper cross member 28.

Referring to FIG. 3, the lower end of each spiral roll include sprockets 54, 56 at each side of bushing 50. A roller chain 58 engages the upper sprocket 56 of one spiral roll 12a and the lower sprocket 56 of the adjacent spiral roll 12b. This drive linking across successive spiral rolls allows them to be driven in synchronism by a motor (not shown). As a result, coordinated rotation of the spiral rolls will promote the log-receiving trough 49 upwards at a rate consistent across the width of the singulator.

The lateral spacing between adjacent spiral rolls is approximately one foot in the preferred embodiment. This allows logs and larger debris to be promoted upward while allowing smaller debris to fall between the rolls. This provides a self-cleaning feature for the device and may be effective for spacings between 6" and 18".

Dragon backs 60 of a thickness of about ¾ of an inch are provided between adjacent spiral rolls 12. The teeth of the dragon backs serve to engage the upward moving log and cause it to rotate. This rotation in turn expels other logs that might have seated themselves in the same log-receiving trough. This feature enhances the singulating activity of the device to ensure that only one log at a time is promoted to the outfeed. Dragon backs 60 are mounted on bars 61 extending parallel to the spiral rolls 12 from the bottom of the rolls to about the mid point of the rolls. Bars 61 are supported by frame members (not shown) such that logs in log-receiving trough 49 do not come into contact with the roll surfaces in the area of the gaps 44 until the log has been promoted in the feed direction past the dragon backs 60.

An alternate method of causing the log to rotate instead of using dragon backs 60 is to incline the spiral rolls 12 several degrees less than the full face angle of the flights 42. As a result the edges of the flights come into contact with the logs rather than the full face of the flight. The rotational action of the edges of the flights coming into contact with the log at this reduced angle will tend to lift the log slightly, thus causing it to rotate. This is the same effect the dragon backs have, but as a result of contact with the edges of the flights instead of the dragon backs. This rotation expels other logs that might have seated themselves in the same log receiving trough. Bars 61 are still used with this roll configuration.

As all spiral rolls 12 rotate in synchronism, logs are picked out of the bundle of logs at the infeed 16 by the action of flights 42 and one or more logs are urged into the log-receiving trough 49. The trough 49 moves upward in the direction of arrow 47. As the trough moves past the dragon backs 60 additional singulating takes place. The log is ultimately discharged at the outfeed 18 onto ramp 63 and a conveyor.

The turning action of the spiral rolls is partially imparted to the log by the face of the flights 42 resulting in a slight displacement of the log in the direction of arrow 67. More pronounced lateral displacement occurs when the log rests on the body of the spiral roll in the area of gaps 44. The turning action of the roll propels the log toward an ending side plate 66. As a result, the logs are effectively ended against ending side plate 66 by the time they reach the outfeed. As premature ending may result in dragging of the log along side plate 66, the bars 61 and dragon backs 60 are arranged to be at a higher elevation than the body of the spiral rolls in the area of the gaps 44 adjacent the bars. By doing so, aggressive ending action is delayed until the log approaches the outfeed 18.

It will be appreciated by those skilled in the art that certain deviations from the preferred embodiment described herein may be practiced and certain alterations may be made without departing from the scope of the invention.

What is claimed is:

1. Log indexing apparatus comprising a plurality of laterally spaced, parallel spiral rolls extending between an inlet location where logs are received in a bundle, and an outlet location at a higher elevation than the inlet location, and wherein:

each of said spiral rolls has flights extending spirally along the length of the rolls;

said outlet location is rearwardly offset from said inlet location;

said spiral rolls have a front to rear inclination; and, a feed direction is defined as being along a line normal to said inlet location and to said outlet location and extending between them and said spiral rolls are further inclined laterally so as to define an angle in relation to the feed direction.

2. Log indexing apparatus as in claim 1 further comprising dragon backs extending generally in the feed direction between adjacent spiral rolls.

3. Log indexing apparatus as in claim 2 wherein means are provided to prevent logs from coming into contact with the shaft portion of the spiral rolls in the lower half of the apparatus.

4. Log indexing apparatus as in claim 1 wherein each spiral roll includes gaps between successive revolutions of the flight on said spiral roll, and wherein the gaps on adjacent spiral rolls are horizontally aligned to define an elongated log-receiving trough.

5. Log indexing apparatus as in claim 4 wherein each of the spiral rolls is rotatable in synchronism with the other spiral rolls so as to promote the log-receiving trough in an even upward motion.

6. Log indexing apparatus as in claim 5 wherein degree of inclination of said spiral rolls from front to rear is between 10° and 80°.

7. Log indexing apparatus as in claim 5 wherein said rotation in synchronism is provided by a lower end of each spiral roll including a chain and sprocket connection with adjacent spiral rolls and the rotation of said spiral rolls being driven by said chain and sprocket connections.

8. Log indexing apparatus as in claim 1 or 5 wherein said flights define a helical face angle in relation to the longitudinal axis of said rolls and the lateral inclination of said spiral rolls in relation to the vertical is within 35° of the helical face angle.

9. Log indexing apparatus as in claim 3 wherein said means comprises providing said dragon backs at a higher elevation than the shaft of the spiral rolls in the area of the gaps adjacent the dragon backs.

10. Log indexing apparatus comprising:

a frame having a front, back and two sides;

a plurality of laterally spaced, parallel spiral rolls extending between an inlet location where logs are received in a bundle, and an outlet location at a higher elevation than the inlet location, each of said spiral rolls having flights extending spirally along the length of the rolls;

said outlet location being rearwardly offset from said inlet location, and wherein said spiral rolls have an inclination from front to rear between said inlet location and said outlet location; and, the spiral rolls are inclined laterally so that their longitudinal axes define an angle of less than 90° in relation to the transverse axis of the frame.

11. Log indexing apparatus as in claim 10 wherein degree of inclination of said spiral rolls from front to rear is between 10° and 80° and wherein said flights define a helical face angle in relation to the longitudinal axis of said rolls and the lateral inclination of said spiral rolls in relation to the vertical is within 35° of the helical face angle.

12. Log indexing apparatus as in claim 1, 10, or 11 wherein adjacent spiral rolls are laterally spaced from one another between 6" and 18".

\* \* \* \* \*